United States Patent [19]
Southgate et al.

[11] Patent Number: 6,120,550
[45] Date of Patent: Sep. 19, 2000

[54] DESIGN FILE TEMPLATES FOR IMPLEMENTATION OF LOGIC DESIGNS

[75] Inventors: Timothy J. Southgate, Redwood City; Michael Wenzler, Piedmont, both of Calif.

[73] Assignee: Altera Corporation

[21] Appl. No.: 08/958,432

[22] Filed: Oct. 27, 1997

Related U.S. Application Data

[60] Provisional application No. 60/029,277, Oct. 28, 1996.

[51] Int. Cl.[7] .................................................... G06F 17/50
[52] U.S. Cl. ................................................. 716/11; 716/18
[58] Field of Search ........................ 395/500.05, 500.02, 395/500.12, 500.19, 500.35

[56] References Cited

U.S. PATENT DOCUMENTS

| 4,768,087 | 8/1988 | Taub et al. ................................. 358/84 |
| 4,916,738 | 4/1990 | Chandra et al. ........................... 380/25 |

(List continued on next page.)

FOREIGN PATENT DOCUMENTS

| 0703531A1 | 3/1996 | European Pat. Off. .......... G06F 9/44 |
| 92/09160 A1 | 5/1992 | WIPO .............................. H04L 9/00 |
| 96/32679 | 10/1996 | WIPO ............................. G06F 13/00 |
| 97/48044 | 12/1997 | WIPO .............................. G06F 9/445 |

OTHER PUBLICATIONS

Summit Design Inc., "Visual HDL for Verilog Short Course," Sep. 19, 1996, pp. 1–167, *IEEE*.

Riley et al., "An Instance of the Application Download Pattern: The SPAIDS Software Loader/Verifier Domain Analysis and Implementation," ACM 1997, pp. 273–278.

Spang, III et al., "The BEACON block–diagram environment," World Congress of the International Federation of Automatic Control, vol. 2, Robust Control, Design and Software, Jul 18, 1993, pp. 749–754.

Rimvall et al., "An Open Architecture for Automatic Code Generation Using the BEACON CACE Environment," Proceedings of IEEE/IFAC Joint Symposium on Computer–Aided Control System Design, Mar. 7, 1994, pp. 315–320.

Girardi et al., "A Register Transfer Level Schematic Editor and Simulator Interface," CSELT Technical Reports, vol. 13, No. 6, Nov. 1985, pp. 403–409.

Heinkel and Glauert, "An Approach for a Dynamic Generation/Validation System for the Functional Simulation Considering Timing Constraints," Proceedings of IEEE/Institute for Computer–Aided Circuit Design, Mar. 11, 1996, pp. 302–306.

Bershad et al., "Lightweight Remote Procedure Call," *ACM Transactions on Computer Systems*, 8:1, pp. 37–55. (1990).

Ganguly, et al., "HSIM1 and HSIM2: Object Oriented Algorithms for VHDL Simulation," *Proceedings of the Seventh Intl. Conf. on VLSI Design*, pp. 175–178 (1994).

Gavish et al., "Dynamic File Migration in Distributed Computer Systems," *Communications of the ACM*, 33:2, pp. 177–189 (1990).

Iftode, et al., "Shared Virtual Memory with Automatic Update Support,"*ICS ACM*, pp. 175–183 (1999).

Keleher, "Tapeworm: High–Level Abstractions Shared Accesses,"*USENIX Association OSDI*, pp. 201–214 (1999).

Maurer, "Efficient Simulatiion for Hierarchical and Partitioned Circuits," *Proceedings of the Twelfth Int. Conf. on VLSI Design*, pp. 236–241 (1999).

*Primary Examiner*—Paul R. Lintz
*Assistant Examiner*—Leigh Marie Garbowski
*Attorney, Agent, or Firm*—Beyer Weaver & Thomas, LLP

[57] ABSTRACT

A method is described herein for generating a design file corresponding to a design entity in a logic design. An input and an output are specified for the design entity. A design file type is specified. The design file is created and a design file template corresponding to the design file type is copied into the design file. The design file template includes formatting corresponding to the design file type. The input and the output are instantiated in the design file. The designer may then completely specify the design entity in the design file.

32 Claims, 7 Drawing Sheets

U.S. PATENT DOCUMENTS

| | | | |
|---|---|---|---|
| 5,008,814 | 4/1991 | Mathur | 364/200 |
| 5,050,091 | 9/1991 | Rubin | 364/488 |
| 5,111,413 | 5/1992 | Lazansky et al. | 364/578 |
| 5,155,836 | 10/1992 | Jordan et al. | 395/500.44 |
| 5,155,837 | 10/1992 | Liu et al. | 395/500 |
| 5,206,939 | 4/1993 | Yanai et al. | 395/400 |
| 5,220,512 | 6/1993 | Watkins et al. | 364/489 |
| 5,278,769 | 1/1994 | Bair et al. | 364/490 |
| 5,301,318 | 4/1994 | Mittal | 395/600 |
| 5,335,320 | 8/1994 | Iwata et al. | 395/155 |
| 5,367,468 | 11/1994 | Fukusawa et al. | 364/490 |
| 5,418,728 | 5/1995 | Yada | 364/468 |
| 5,422,833 | 6/1995 | Kelem et al. | 364/488 |
| 5,423,023 | 6/1995 | Batch et al. | 395/500 |
| 5,436,849 | 7/1995 | Drumm | 364/490 |
| 5,442,790 | 8/1995 | Nosenchuck | 395/700 |
| 5,463,563 | 10/1995 | Bair et al. | 395/500.12 |
| 5,499,192 | 3/1996 | Knapp et al. | 364/489 |
| 5,513,124 | 4/1996 | Trimberger et al. | 364/491 |
| 5,524,253 | 6/1996 | Pham et al. | 395/800 |
| 5,526,517 | 6/1996 | Jones et al. | 395/600 |
| 5,541,849 | 7/1996 | Rostoker et al. | 364/489 |
| 5,572,436 | 11/1996 | Dangelo et al. | 364/489 |
| 5,572,437 | 11/1996 | Rostoker et al. | 364/489 |
| 5,574,655 | 11/1996 | Knapp et al. | 364/489 |
| 5,594,657 | 1/1997 | Cantone et al. | 364/490 |
| 5,623,418 | 4/1997 | Rostoker et al. | 364/489 |
| 5,625,565 | 4/1997 | Van Dyke | 395/500.02 |
| 5,652,874 | 7/1997 | Upson et al. | |
| 5,661,660 | 8/1997 | Freidin | 364/489 |
| 5,673,198 | 9/1997 | Lawman et al. | 364/489 |
| 5,691,912 | 11/1997 | Duncan | 364/490 |
| 5,696,454 | 12/1997 | Trimberger | 326/38 |
| 5,715,387 | 2/1998 | Barnstijn et al. | 395/183.14 |
| 5,721,912 | 2/1998 | Stepczyk et al. | 395/613 |
| 5,737,234 | 4/1998 | Seidel et al. | 395/500.02 |
| 5,745,748 | 4/1998 | Ahmad et al. | 395/610 |
| 5,761,079 | 6/1998 | Drumm | 364/489 |
| 5,790,416 | 8/1998 | Norton et al. | 364/490 |
| 5,801,958 | 9/1998 | Dangelo et al. | 364/489 |
| 5,805,861 | 9/1998 | Gilbert et al. | 395/500 |
| 5,809,145 | 9/1998 | Slik et al. | 380/25 |
| 5,812,847 | 9/1998 | Joshi et al. | 395/682 |
| 5,819,072 | 10/1998 | Bushard et al. | 395/500 |
| 5,848,263 | 12/1998 | Oshikiri | 395/500 |
| 5,850,348 | 12/1998 | Berman | 364/488 |
| 5,867,691 | 2/1999 | Shiraishi | 395/551 |
| 5,870,308 | 2/1999 | Dangelo et al. | 364/489 |
| 5,878,225 | 3/1999 | Bilansky et al. | 395/200.57 |
| 5,896,521 | 4/1999 | Shackleford et al. | 395/500 |
| 5,901,066 | 5/1999 | Hong | 364/491 |
| 5,903,475 | 5/1999 | Gupte et al. | 364/578 |
| 5,909,545 | 6/1999 | Frese et al. | 395/200.38 |
| 5,983,277 | 11/1999 | Heile et al. | 709/232 |

```
ENTITY ADD IS
    PORT
    (
    I1[7...0]          :IN STD_LOGIC
    I2[7...0]          :IN STD_LOGIC
    SUM[7...0]    :OUT STD_LOGIC
    );
END ADD;
ARCHITECTURE a OF ADD IS
BEGIN

END a;
```

6,120,550

DESIGN FILE TEMPLATES FOR IMPLEMENTATION OF LOGIC DESIGNS

RELATED APPLICATION DATA

The present application claims priority from U.S. Provisional Application Ser. No. 60/029,277 entitled TOOLS FOR DESIGNING PROGRAMMABLE LOGIC DEVICES filed on Oct. 28, 1996, the entire specification of which is incorporated herein by reference.

This invention is related to U.S. patent application Ser. No. 08/958,002, filed on the same day as this patent application, naming B. Pedersen et al. as inventors, and entitled "GENERATION OF SUBNET LISTS FOR USE IN INCREMENTAL COMPILATION." That application is incorporated herein by reference in its entirety and for all purposes.

This invention is also related to U.S. patent application Ser. No. 08/958,436, filed on the same day as this patent application, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on the same day as this patent application, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related U.S. patent application Ser. No. 08/958,626, filed on the same day as this patent application, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Ser. No. 08/958,778, filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on the same day as this patent application, naming T. Southgate as inventor, and entitled "METHOD FOR SIMULATING A CIRCUIT DESIGN" That application is incorporated herein by reference in its entirety and for all purposes.

This invention is also related to U.S. patent application Ser. No. 08/957,957, filed on the same day as this patent application, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety.

BACKGROUND OF THE INVENTION

The present invention relates to methods and apparatus for designing integrated circuits. More specifically, the invention relates to a method for generating design files in which the implementation of a design entity in a logic design may be specified. Even more specifically, a particular embodiment of the invention creates a design file using a design file template of a specified format, and instantiates I/O either from a graphics file (e.g., a block diagram) or text file (e.g., a VHDL file) under software control directly from the source file into the design file in the specified format.

Integrated circuits, and specifically programmable logic devices (PLDs), may be designed with a wide variety of software design tools which allow the designer to implement design entities either using a graphic editor to interconnect blocks and/or logic gates in a graphical user interface (GUI), or using a text editor to specify the implementation in a text based programming language such as VHDL or Verilog. Such text based design tools require a high level of programming knowledge and skill. Moreover, the complete (i.e., circuit level) specification of a particular design entity is typically a rather tedious and time consuming process with text based design tools. The designer must create a file with the proper formatting and then describe everything from the I/O of the design entity to its circuit level implementation, all in a complex, syntax-driven format. This workload is exacerbated by the fact that, even though much of the formatting is redundant from design file to design file, there is currently no convenient way of taking advantage of this redundancy.

It is therefore apparent that there is a need for a logic design tool which takes advantage of the formatting redundancies among design files to facilitate the generation of design files.

SUMMARY OF THE INVENTION

According to the present invention, a method is described herein for generating a design file in which the implementation of a design entity in a logic design may be specified. More specifically, a particular embodiment of the present invention is employed with a graphic editor which is used to create block diagrams. When the designer is ready to specify the implementation of a particular block in the block diagram, he uses a design file template in any of a variety of text or graphic formats to create a design file in which the I/O specification of the block is instantiated. The designer then specifies the implementation of the block in the newly created design file using, for example, a schematic editor for a graphic format or a text editor for a text format.

According to the invention, each design file template is specific to a particular format (e.g., VHDL or Verilog) and contains the formatting required to create a design file in that format. Using the template, an incomplete design file is generated in a specified format in which the I/O specification of a selected design entity is then instantiated. For the text formats supported by the present invention, e.g., VHDL and Verilog, a design template file includes much of the complicated formatting which the designer would otherwise need to write. The designer then completes the design file by specifying the implementation of the design entity within the newly created design file using the appropriate editor. This design process proves to be much less labor intensive than one in which the designer uses the editor to create the design file from scratch. As will be understood, this aspect of the invention is particularly advantageous with regard to the more complex, syntax-heavy, text based design file formats such as VHDL and Verilog. In addition, according to more specific embodiments of the invention, the designer may customize the design file template to incorporate personal preferences such as, for example, keyword attributes and documentation styles.

Thus, the present invention provides a method for generating a design file corresponding to a design entity in a logic design. An input and an output are specified for the design entity. A design file type is specified. The design file is created and a design file template corresponding to the design file type is copied into the design file. The input and the output are instantiated in the design file A further understanding of the nature and advantages of the present invention may be realized by reference to the remaining portions of the specification and the drawings.

DESCRIPTION OF SPECIFIC EMBODIMENTS

The present invention may be employed with a graphic editor as described in commonly assigned, copending U.S. patent application Ser. No. 08/958,434 entitled GRAPHIC EDITOR FOR BLOCK DIAGRAM LEVEL DESIGN OF CIRCUITS, filed simultaneously herewith, the entire specification of which is incorporated herein by reference. A specific embodiment of the present invention will now be described according to a particular design methodology. It will be understood, however, that a wide variety of design methodologies may employ the techniques described herein and be within the scope of the invention.

Figure 1:
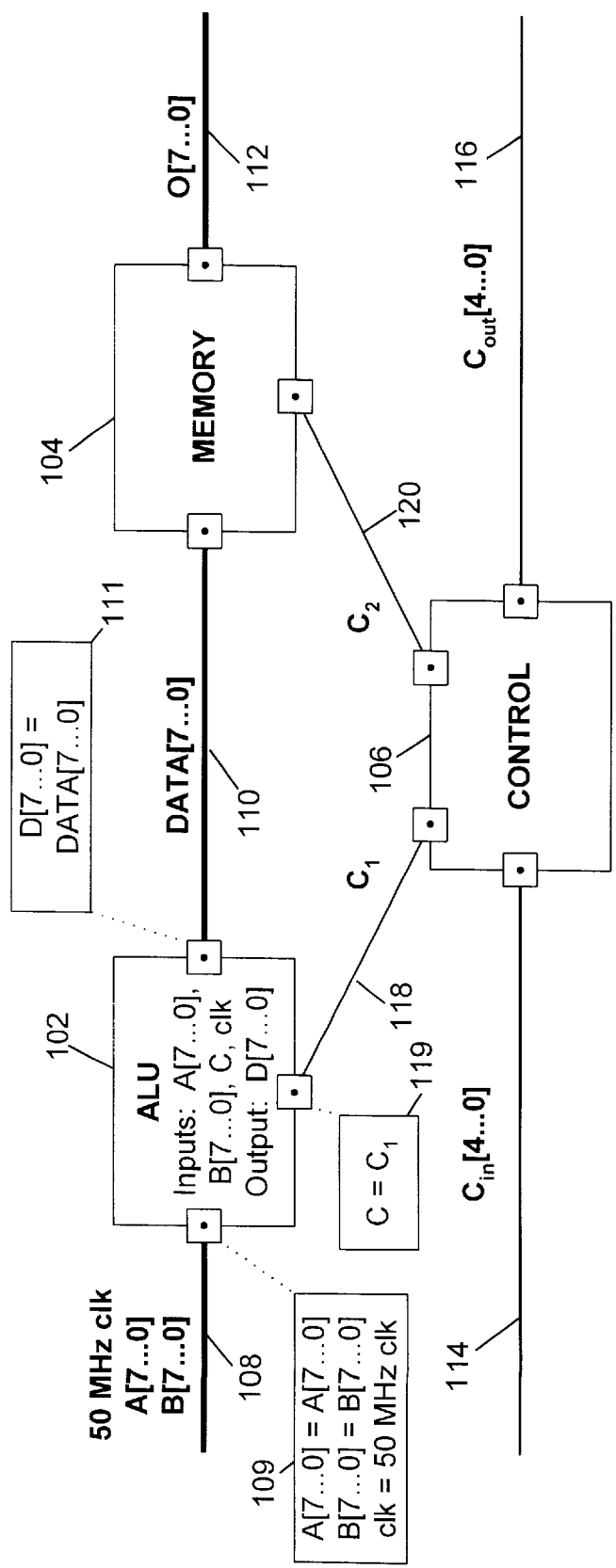
FIG. 1 is a block diagram for illustrating a specific embodiment of the invention.

FIG. 1 is a block diagram which will be used to describe how a particular embodiment of the invention relates to an overall design. For the purposes of this example, it will be assumed that the block diagram of FIG. 1 was created using the graphic editor described in the above-referenced patent application. It will be understood, however, that this is assumed merely for illustrative purposes and that the I/O for such a design entity may be specified and incorporated into a design file in a variety of ways and still remain within the scope of the invention.

Using standard elements in the graphic editor or his own customized elements, the designer lays; out on the screen of his workstation a high level design of his circuit according to the system specifications which may include, for example, the device external specification (e.g., pinout) and the timing requirements. The design may include, for example, an arithmetic logic unit (ALU) 102, a memory 104, and some kind of control circuitry 106. The designer then interconnects blocks 102, 104 and 106 and specifies external connections to the device via a plurality of conduits, each of which represents one or more signals in either direction as required to implement the functionalities desired by the designer. For example, conduit 108 represents input signals A[7 . . . 0] and B[7 . . . 0] and a 50 MHz clock signal. Conduit 110, with the specification DATA[7 . . . 0], represents the data lines between ALU 102 and memory 104. Conduit 112, with the specification O[7 . . . 0], represents the output signal or signals of the device. Conduits 114 and 116 respectively represent the control inputs and outputs to the device as specified by $C_{in}$[4 . . . 0] and $C_{out}$[4 . . . 0]. Finally, conduits 118 and 120 respectively represent control signals $C_1$ and $C_2$ for ALU 102 and memory 104.

The designer then specifies the I/O for each of the blocks. For example, the ALU (block 102) receives two data inputs and, given some control input, provides an output. Thus, the designer might specify inputs A[7 . . . 0] and B[7 . . . 0], control input C, and data output D[7 . . . 0]. A clock input clk would also typically be specified. I/O for memory block 104 and control circuitry 106 (not shown) are similarly specified. The I/O for each block are then mapped to the signal names in the associated conduits. This enables the designer to specify a particular block very generally so that it may be used elsewhere in the design or in other designs. Thus inputs A[7 . . . 0] and B[7 . . . 0] are mapped to identically named signals A[7 . . . 0] and B[7 . . . 0] in conduit 108 while the input clk is mapped to 50 MHz clock in the same conduit (see box 109). Output D[7 . . . 0] is mapped to DATA[7 . . . 0] in conduit 110 (box 111) while input C is mapped to $C_1$ in conduit 118 (box 119). Although not shown, the I/O for blocks 104 and 106 are similarly mapped to the associated conduits. The fully specified block diagram, i.e., the drawing information, is stored in a graphic design file.

Figure 2A:
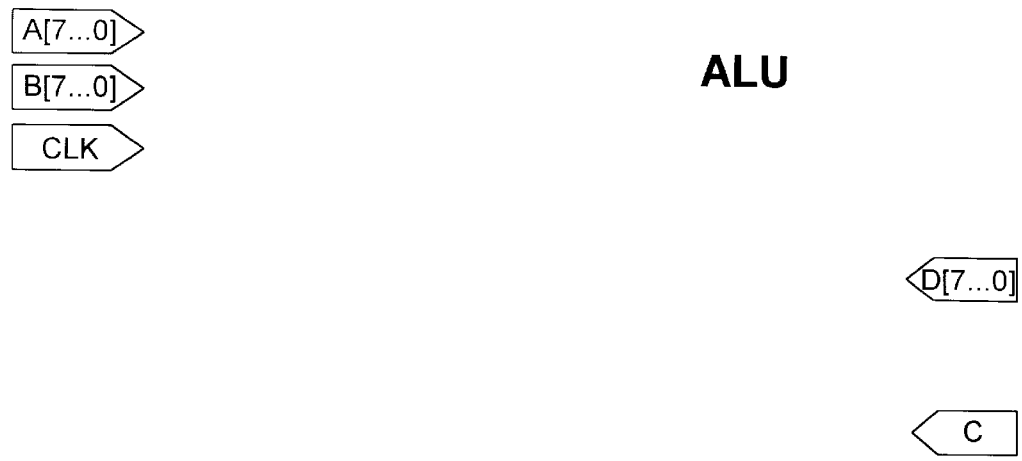
FIG. 2a is a user interface representation of an incomplete graphic design file created using a design file template.
Figure 2B:
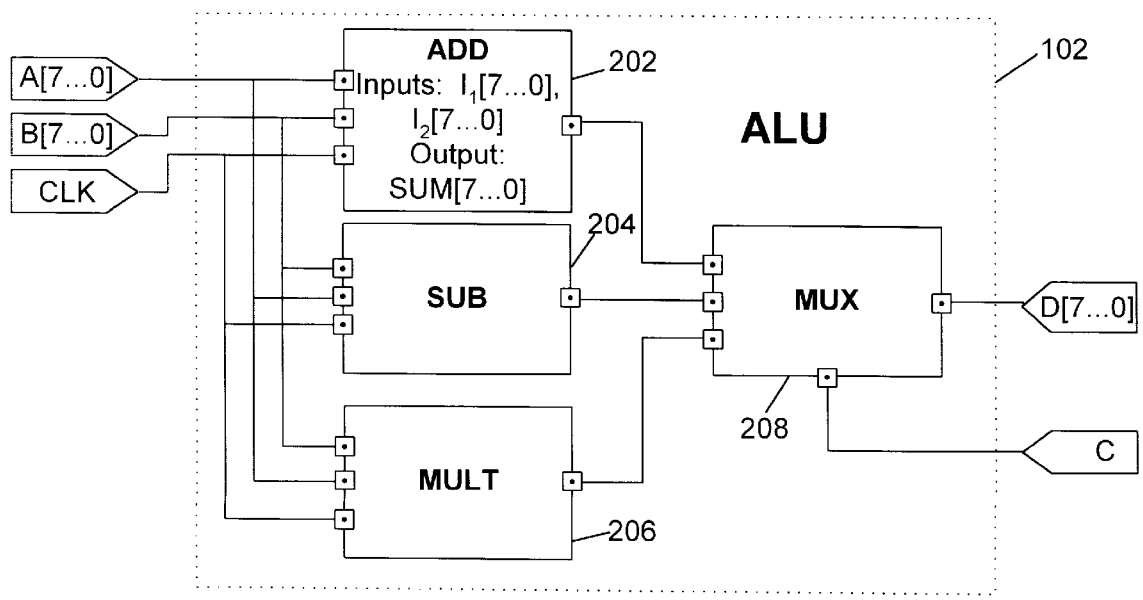
FIG. 2b is the user interface representation of FIG. 2a after being specified.

Once the designer has a fully specified such a high level block diagram he may create more detailed block diagrams of each of the blocks in the high level diagram as required by executing a "hierarchy down" command which creates a new lower level design file for a selected block using a design file template, and instantiates the I/O of the selected block in the design file format specified by the designer. The process by which the design file is created will be discussed in greater detail below. In this example, the designer specified a graphic format for ALU 102 and created an incomplete lower level design file as represented by the GUI shown in FIG. 2a. FIG. 2b is a block diagram of ALU 102 after being completely specified by the designer using the same (graphic editor used to create the block diagram of FIG. 1. Adder 202, subtractor 204 and multiplier 208 each receive input A[7 . . . 0] and B[7 . . . 0] along with clock signal CLK, and provide an output to multiplexer 210 which is controlled by input C and provides output D[7 . . . 0]. Each of the block I/O and conduit signal names within ALU 102 may be fully specified by the designer and mapped to each other using substantially he same procedure as described above with reference to FIG. 1. The I/O and signal names may, as in this example, or may not correspond to those of the higher level diagram depending upon what nomenclature scheme makes the most sense for the particular design. In this example, the I/O of adder 202 include inputs $I_1$[7 . . . 0] and $I_2$[7 . . . 0] and output SUM[7 . . . 0].

Figures 3A, 3B:
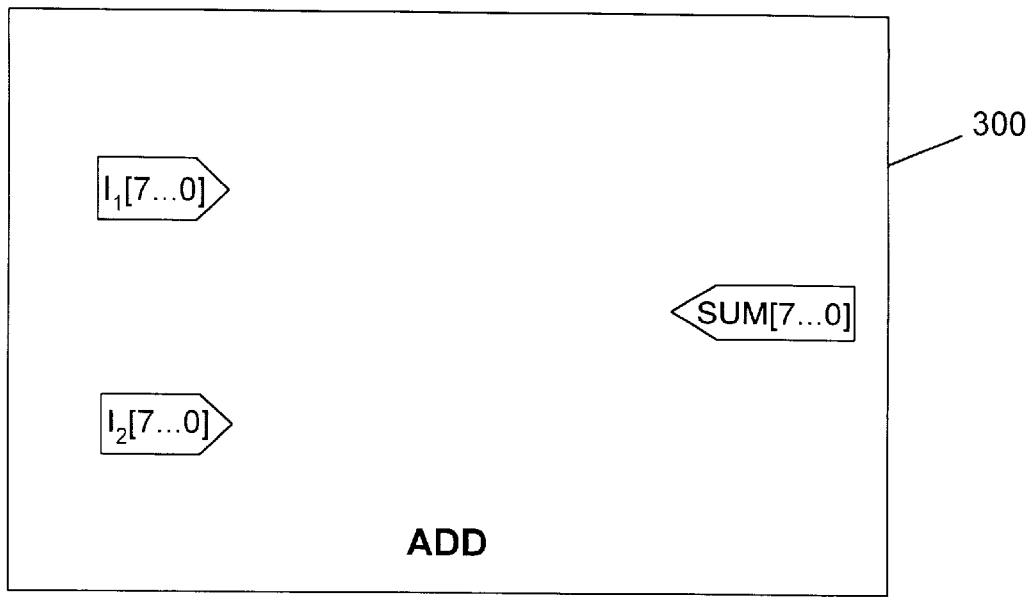
FIGS. 3a and 3b are user interface representations of graphic and text design file templates, respectively.

The block diagram of FIG. 2b is then employed in combination with the design file templates of the present invention to create a circuit level design file for each block in the design file format specified by the designer. That is, using the block diagram and a design file template, an incomplete design file is created which instantiates the I/O specification of a selected block in the specified design file format. As discussed above, for the text formats supported by the present invention, the design file template includes much of the complicated formatting syntax which the designer would otherwise be required to write. FIGS. 3a and 3b represent two alternative user interfaces 300 and 350 as they would appear for newly created design files in two different formats which correspond to the same design entity, i.e., adder 202 of FIG. 2b. Design file 300 is a user interface corresponding to a graphic design file created according to the present invention. Design file 350 is a user interface corresponding to a VHDL text design file created according to the present invention. The designer then completes the design file by specifying the implementation of the block using a text or a graphic editor as appropriate. This may then be done for each of the blocks in the block diagram.

Figure 4:
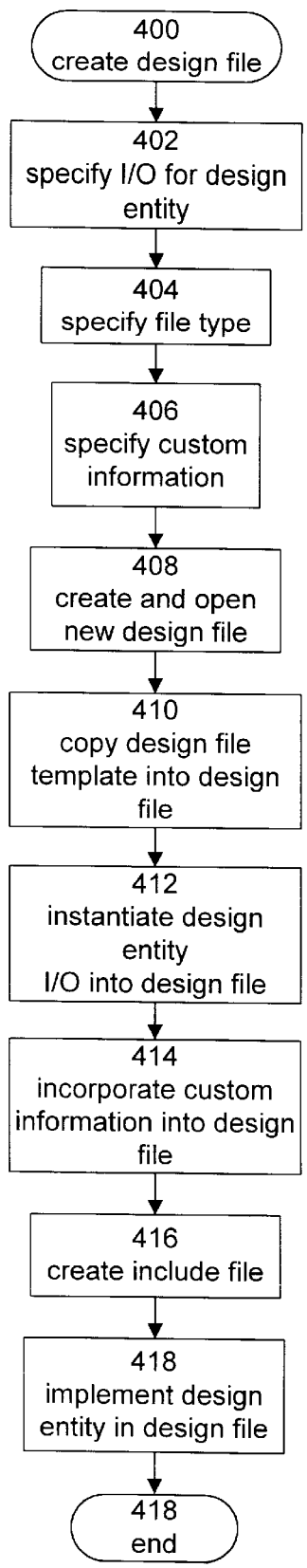
FIG. 4 is a flowchart illustrating the creation of a design file according to a specific embodiment of the invention.

FIG. 4 is a flowchart illustrating the creation of a design file according to a particular embodiment of the invention. Intially, the designer specifies the I/O for the design entity, e.g., block (step 402). The I/O may be imported from a higher level design file or entered in response to a dialog box. In the block diagram of FIG. 1, this is represented by the specification of inputs A[7 . . . 0], B[7 . . . 0], C, and clk, and output D[7 . . . 0] of ALU 102. The designer then specifies the type of design file he wishes to create (step 404). As discussed above, the designer may specify a text design file format, e.g., VHDL or Verilog, or a graphic design file format to be manipulated using a graphic or schematic editor. The designer may also specify other information (step 406) including, for example, customized style information (e.g., keywords all in caps), formatting for comments or documentation, file name, directory location, etc. Alternatively, user specified customization information may be incorporated directly into the design file templates themselves.

The information specified in steps 402–406 is then employed to create and open a new design file in the appropriate text or graphic editor (step 408), copy the appropriate design template into the newly created design file (step 410), instantiate the I/O of the design entity in the design file (step 412), and incorporate the custom information of step 406 into the design file (step 414). A separate "include" file associated with the design file is also created. The include file stores the interface information of the design file for the purpose of allowing other design files of different formats to incorporate an instance of the associated design file into their designs This will be described in greater detail below. The designer is then ready to implement the design entity in the newly created design file (step 418) using the editor in which the file was opened. This may entail creation of a lower level block diagram, specification of the circuit level implementation of the design entity, or a combination of both.

Figure 5:
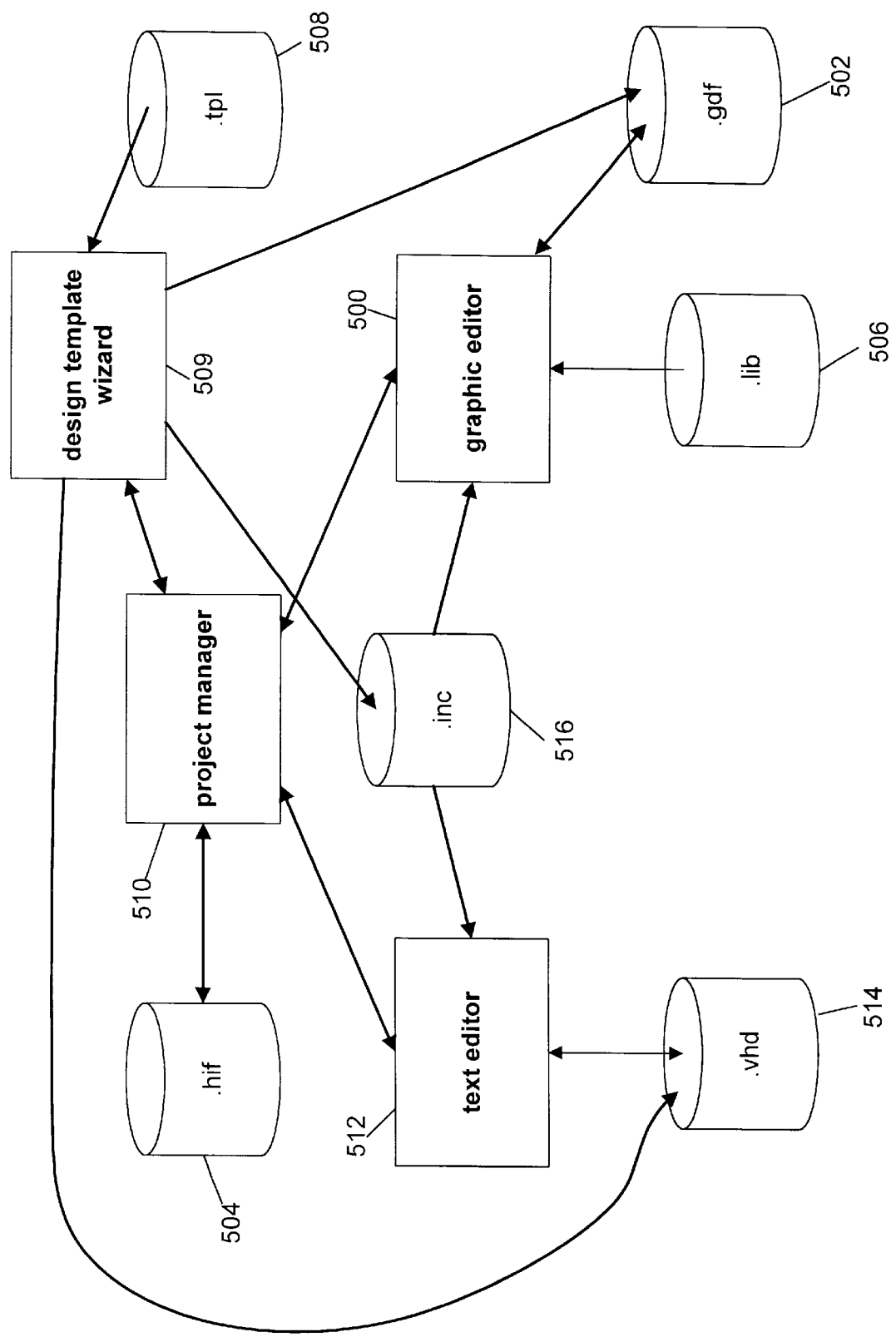
FIG. 5 is an information flow diagram according to a specific embodiment of the invention.

FIG. 5 is a diagram which illustrates the flow of information in a system which employs the design file templates according to a specific embodiment of the invention. Graphic editor 500 reads from and writes; to graphic design database 502 in which all design files created using the graphic editor are stored, and hierarchy information database 504 in which the hierarchy information files for each IC design are stored. Graphic editor 500 uses blocks and symbols from library database 506 to construct tie block diagrams. Design file templates in database 508 correspond to a variety of design file formats and are manipulated with a design template wizard 509 to generate design files. A project manager 510 interacts with and facilitates the operation of graphic editor 500 and text editor 512 (as well as a variety of other software modules). For example, as shown, project manager 510 interacts with hierarchy information database 504 to determine when an update of a design file is necessary and notifies the appropriate editor. Text editor 512 reads from and writes to text design file database 514 (in this example a repository of VHDL files) and reads from include file database 516 from which graphic editor 500 also reads.

Each of the include files in database 516 stores only the interface information, i.e., I/O specification, for an associated design file. According to one embodiment, an include file is created automatically when the design file is created. According to another embodiment, the user controls whether and when an include file is created. An include file allows the incorporation of a "child" design file in a "parent" design file even where the design files are in different formats (e.g., text vs. graphic) by storing the interface information of the child in a format that the parent file will understand. That is, in the same format as the parent. In fact, include files may themselves be created using design file templates of the present invention. When design template wizard 509 creates a design file using templates from database 508, the new design file is written to the appropriate design file database (e.g., database 502 or 514) and the relevant interface information is written to include database 516.

Figure 6:
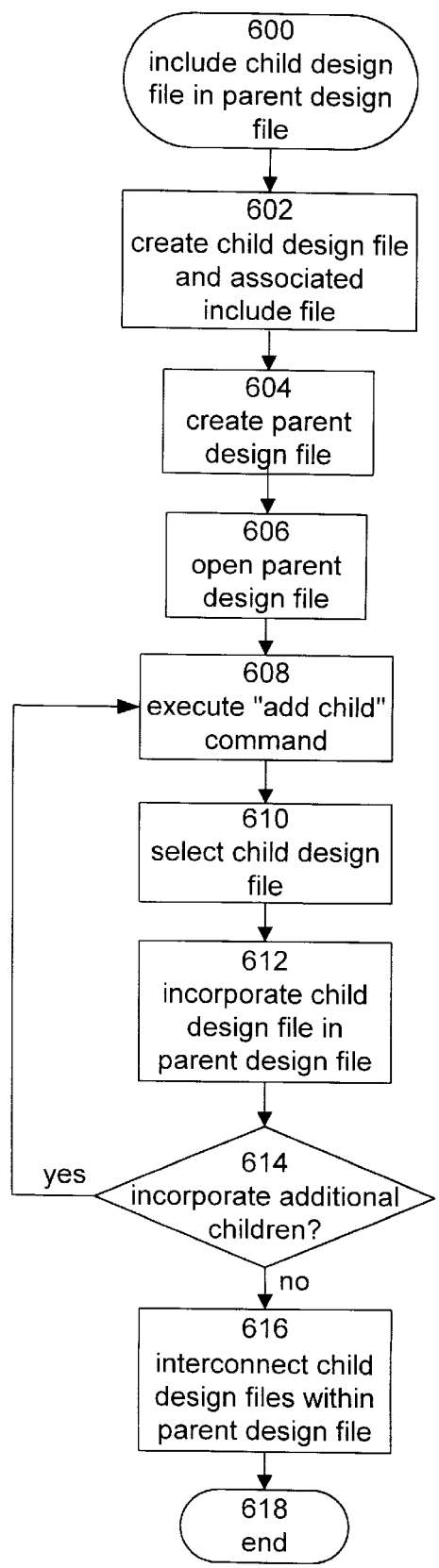
FIG. 6 is a flowchart illustrating the incorporation of a child design file into a parent design file.

The incorporation of a child design file in a parent design file will now be described with reference to the flowchart of FIG. 6. Notwithstanding this description, it will be understood that the child and parent may comprise any combination of text and graphic formats. Initially, a completely specified child design file and its associated include file are created (step 602) using any of a variety of techniques. Such techniques may include, for example, the use of a text editor, or the technique described above with reference to FIGS. 1–4. The parent design file is then created using an appropriate design template file (step 604) and opened in the appropriate graphic or text editor (step 606). Upon execution of an "add child" command from the user (step 608), a dialog box is presented to the user requesting the selection of a particular child design file. At this point, the user may select an existing child design file or create a new child design file in the manner described above. Once the child design file is selected (step 610), it is incorporated into the parent design file (step 612) by adding a reference to the include file associated with the child. If additional child design files are to be incorporated into the parent (step 614) steps 608–612 are repeated for the additional children. The child design files are then interconnected in the parent design file with the appropriate logic as the designer implements the parent design (step 616).

Figure 7:
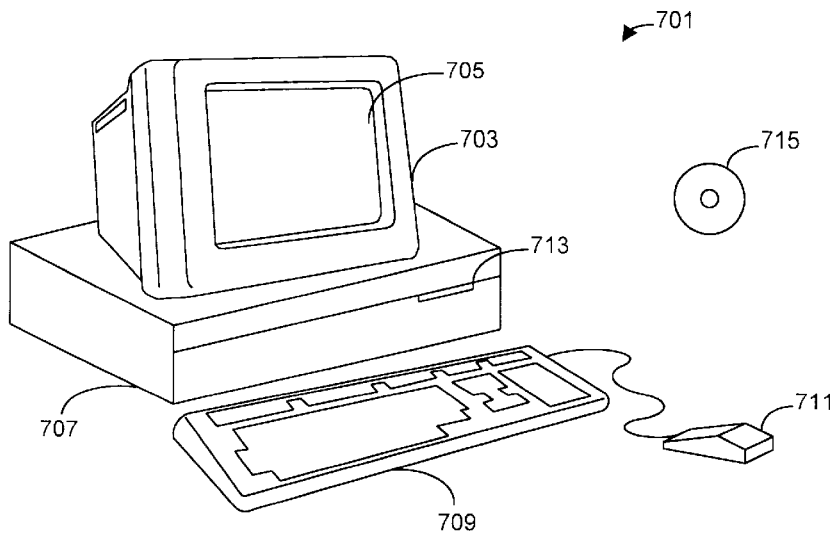
FIG. 7 is an example of a computer system that may be utilized to execute the software of an embodiment of the invention.

FIG. 7 illustrates an example of a computer system that may be used to execute the software of an embodiment of the invention. FIG. 7 shows a computer system 701 which includes a display 703, screen 705, cabinet 707, keyboard 709, and mouse 711. Mouse 711 may have one or more buttons for interacting with a graphical user interface. Cabinet 707 houses a CD-ROM drive 713, system memory and a hard drive (see FIG. 8) which may be utilized to store and retrieve software programs incorporating computer code that implements the invention, data for use with the invention, and the like. Although the CD-ROM 715 is shown as an exemplary computer readable storage medium, other computer readable storage media including floppy disks, tape, flash memory, system memory, and hard drives may be utilized.

Figure 8:
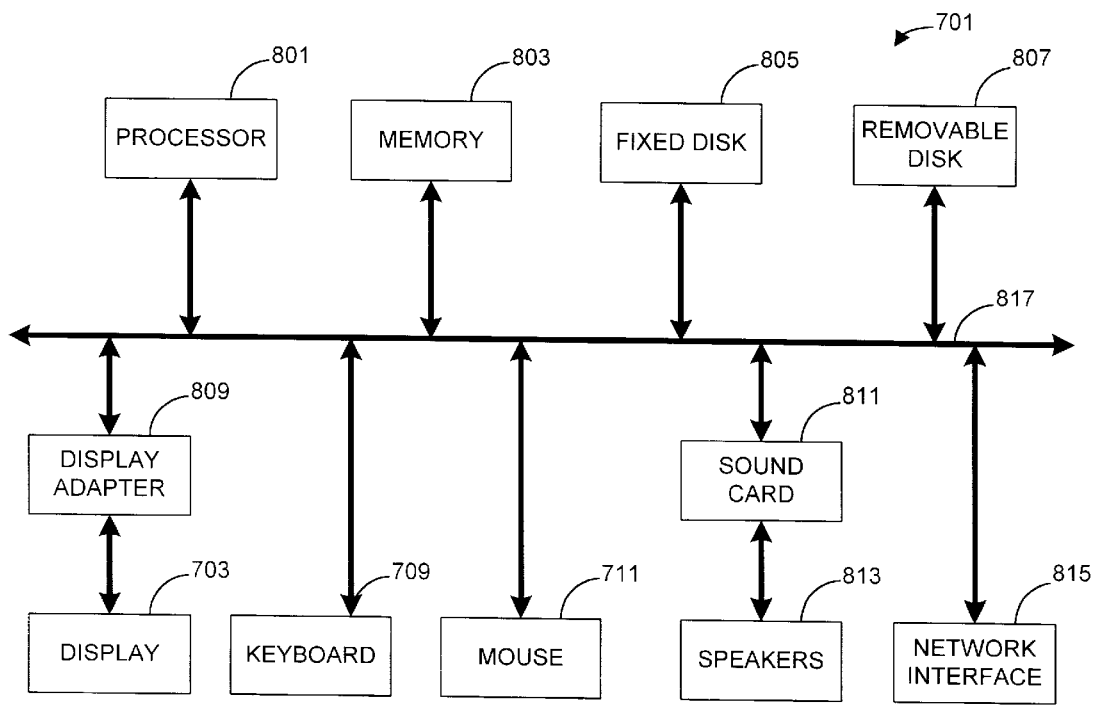
FIG. 8 shows a system block diagram of the computer system of FIG. 7.

FIG. 8 shows a system block diagram of computer system 801 used to execute the software of an embodiment of the invention. As in FIG. 7, computer system 701 includes monitor 703 and keyboard 709, and mouse 711. Computer system 701 further includes subsystems such as a central processor 801, system memory 803, fixed disk 805 (e.g., hard drive), removable disk 807 (e.g., CD-ROM drive), display adapter 809, sound card 811, speakers 813, and network interface 815. Other computer systems suitable for use with the invention may include additional or fewer subsystems. For example, another computer system could include more than one processor 801 (i.e., a multi-processor system), or a cache memory.

The system bus architecture of computer system 701 is represented by arrows 817. However, these arrows are illustrative of any interconnection scheme serving to link the subsystems. For example, a local bus could be utilized to connect the central processor to the system memory and display adapter. Computer system 701 shown in FIG. 8 is but an example of a computer system suitable for use with the invention. Other computer architectures having different configurations of subsystems may also be utilized.

While the invention has been particularly shown and described with reference to specific embodiments thereof, it will be understood by those skilled in the art that changes in the form and details of the disclosed embodiments may be made without departing from the spirit or scope of the invention. For example, the present invention has been described with reference to a design process in which an I/O specification for a design entity created with a graphic editor is instantiated in a design file created using a template according to the invention. It will be understood, however, that the I/O for the design entity could have been specified in a text based programming language such as, for example, VHDL without departing from the scope of the invention. Moreover, the present invention is not restricted to the design of a specific type of circuitry. Rather the present invention may be employed, for example, in the design of programmable logic devices, gate arrays, discrete circuitry, and a wide variety of integrated circuits. Therefore, the scope of the invention should be determined with reference to the appended claims.

What is claimed is:

1. A method for automatically generating a first design file corresponding to a design entity in a logic design, comprising:

specifying an input and an output for the design (entity;

specifying a design file type from among a plurality of design file types having graphic and text formats;

creating the first design file;

copying a design file template corresponding to the design file type into the first design file; and instantiating the input and the output in the first design file thereby generating an incomplete design file in which the design entity may be further specified.

2. The method of claim 1 further comprising generating a block diagram corresponding to the logic design, the block diagram including the design entity.

3. The method of claim 2 wherein the block diagram is generated and the input and output specified in a graphical user interface.

4. The method of claim 3 wherein the input and the output are instantiated from the block diagram under software control.

5. The method of claim 1 further comprising specifying a circuit level implementation of the design entity in the first design file.

6. The method of claim 5 wherein the first design file comprises a text design file and the circuit level implementation is specified with a text editor.

7. The method of claim 5 wherein he first design file comprises a graphic design file and the circuit level implementation is specified with a graphic editor.

8. The method of claim 1 wherein the first design file template comprises design file formatting corresponding to the design file type.

9. The method of claim 8 wherein the design file formatting comprises programming language syntax.

10. The method of claim 8 wherein the design file formatting comprises graphical user interface elements.

11. The method of claim 1 further comprising:

creating a second design file and an include file associated therewith, the include file having interface information corresponding to the second design file stored therein; and incorporating the second design file into the first design file using the interface information.

12. The method of claim 11 wherein the first and second design files comprise first and second formats, respectively, and wherein the first and second formats are the same.

13. The method of claim 11 wherein the first and second design files comprise first and second formats, respectively, and wherein the first and second formats are different.

14. At least one computer readable medium containing program instructions for generating a first design file corresponding to a design entity in a logic design, said at least one computer readable medium comprising:

computer readable code for specifying an input and an output for the design entity;

computer readable code for specifying a design file type from among a plurality of design file types having graphic and text formats;

computer readable code for creating the first design file;

computer readable code for copying a design file template corresponding to the design file type into the first design file; and computer readable code for instantiating the input and the output in the first design file thereby generating an incomplete design file in which the design entity may be further specified.

15. A design file template for generating a design file corresponding to a design entity in an logic design, the design file template corresponding to a design file type having one of a plurality of graphic and text formats and comprising design file formatting corresponding to the design file type and wherein the design file generated from the design file template is incomplete and may be used to further specify the design entity.

16. The design file template of claim 15 wherein the design file comprises a text design file and the design file formatting comprises programming language syntax.

17. The design file template of claim 15 wherein the design file comprises a graphic design file and the design file formatting comprises graphical user interface elements.

18. A design file corresponding to a design entity in a logic design automatically generated by a method comprising:
    specifying an input and an output for the design entity;
    specifying a design file type from among a plurality of design file types having graphic and text formats;
    creating the design file;
    copying a design file template corresponding to the design file type into the design file; and
    instantiating the input and the output in the first design file thereby generating an incomplete design file in which the design entity may be further specified.

19. The at least-one computer readable medium of claim 14 further comprising computer readable code for generating a block diagram corresponding to the logic design, the block diagram including the design entity.

20. The at least one computer readable medium of claim 19 wherein the computer readable code for generating the block diagram and the computer readable code for specifying the input and the output are operable to generate the block diagram and specify the input and the output in a graphical user interface.

21. The at least one computer readable medium of claim 20 wherein the computer readable code for specifying an input and an output is operable to instantiate the input and the output from the block diagram.

22. The at least one computer readable medium of claim 14 further comprising computer readable code for specifying a circuit level implementation of the design entity in the first design file.

23. The at least one computer readable medium of claim 22 wherein the first design file comprises a text design file and the computer readable code for specifying the circuit level implementation comprises a text editor.

24. The at least one computer readable medium of claim 22 wherein the first design file comprises a graphic design file and the computer readable code for specifying the circuit level implementation comprises a graphic editor.

25. The at least one computer readable medium of claim 14 wherein the design file template comprises design file formatting corresponding to the design file type.

26. The at least one computer readable medium of claim 25 wherein the design file formatting comprises programming language syntax.

27. The at least one computer readable medium of claim 25 wherein the design file formatting comprises graphical user interface elements.

28. The at least one computer readable medium of claim 14 further comprising:
    computer readable code for creating a second design file and an include file associated therewith, the include file having interface information corresponding to the second design file stored therein; and
    computer readable code for incorporating the second design file into the first design file using the interface information.

29. The at least one computer readable medium of claim 28 wherein the first and second design files comprise first and second formats, respectively, and wherein the first and second formats are the same.

30. The at least one computer readable medium of claim 28 wherein the first and second design files comprise first and second formats, respectively, and wherein the first and second formats are different.

31. A design file corresponding to a design entity in a logic design, the design file being automatically generated using program instructions stored in at least one computer readable medium, the at least one computer readable medium comprising:
    computer readable code for specifying an input and an output for the design entity;
    computer readable code for specifying a design file type from among a plurality of design file types having graphic and text formats;
    computer readable code for creating the design file;
    computer readable code for copying a design file template corresponding to the design file type into the design file; and
    computer readable code for instantiating the input and the output in the first design file thereby generating an incomplete design file in which the design entity may be further specified.

32. A computer system comprising:
    a central processing unit;
    a display;
    a keyboard; and
    memory having stored therein program instructions for generating a first design file corresponding to a design entity in a logic design, the memory comprising:
    computer readable code for specifying an input and an output for the design entity;
    computer readable code for specifying a design file type from among a plurality of design file types having graphic and text formats;
    computer readable code for creating the first design file;
    computer readable code for copying a design file template corresponding to the design file type into the first design file; and
    computer readable code for instantiating the input and the output in the first design file thereby generating an incomplete design file in which the design entity may be further specified.

* * * * *